United States Patent
Bliss

(10) Patent No.: US 7,454,747 B2
(45) Date of Patent: Nov. 18, 2008

(54) DETERMINING MAXIMUM ACCEPTABLE SCHEDULING LOAD LATENCY USING HIERARCHICAL SEARCH

(75) Inventor: Brian E. Bliss, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 979 days.

(21) Appl. No.: 10/360,177

(22) Filed: Feb. 7, 2003

(65) Prior Publication Data

US 2004/0158826 A1     Aug. 12, 2004

(51) Int. Cl.
*G06F 9/45*    (2006.01)

(52) U.S. Cl. ...................................... 717/151
(58) Field of Classification Search .................. 717/151
See application file for complete search history.

(56) References Cited

U.S. PATENT DOCUMENTS

| | | | |
|---|---|---|---|
| 5,361,357 A | 11/1994 | Kionka | |
| 5,491,823 A | 2/1996 | Ruttenberg | |
| 5,664,193 A * | 9/1997 | Tirumalai | ................... 717/153 |
| 5,805,895 A | 9/1998 | Breternitz, Jr. et al. | |
| 5,809,308 A | 9/1998 | Tirumalai | |
| 5,835,745 A | 11/1998 | Sager et al. | |
| 5,835,776 A | 11/1998 | Tirumalai et al. | |
| 5,862,384 A | 1/1999 | Hirai | |
| 5,867,711 A | 2/1999 | Subramanian et al. | |
| 5,930,510 A | 7/1999 | Beylin et al. | |
| 5,964,867 A * | 10/1999 | Anderson et al. | ........... 712/219 |
| 6,035,389 A * | 3/2000 | Grochowski et al. | ........ 712/216 |
| 6,304,953 B1 * | 10/2001 | Henstrom et al. | ........... 712/215 |
| 6,308,261 B1 * | 10/2001 | Morris et al. | ................ 712/219 |
| 6,341,370 B1 * | 1/2002 | Tirumalai et al. | ........... 717/141 |
| 6,438,682 B1 | 8/2002 | Morris et al. | |
| 6,438,747 B1 | 8/2002 | Schreiber et al. | |
| 6,460,173 B1 | 10/2002 | Schreiber | |
| 6,671,878 B1 * | 12/2003 | Bliss | .......................... 717/161 |

OTHER PUBLICATIONS

Eichenberger, Alexandre E. et al., "*Minimum Register Requirements for a Modulo Schedule*", Proceedings of the 27th Annual International Symposium on Microarchitecture, pp. 75-84, Nov. 1994.
Eichenberger, Alexandre E. et al., "*Optimum Modulo Schedules for Minimum Register Requirements*", Proceedings of the 1995 International Conference on Supercomputing, pp. 31-40, Jul. 1995.

(Continued)

*Primary Examiner*—John Chavis
(74) *Attorney, Agent, or Firm*—Dorsey & Whitney LLP

(57) ABSTRACT

The present application describes techniques for determining maximum acceptable modeled load latency (e.g., a model number of clock cycles required between the time a load issues and the time its use can issue) for instruction scheduling which uses less compile time, on the order of $\log_2$ (Maximum load latency—Minimum load latency). Typically, during instruction scheduling, register pressure is monotonically non-decreasing with respect to the scheduled load latency. Therefore, in some embodiments, a hierarchical search method is used to determine the acceptable schedule with the largest modeled load latency. According to an embodiment, a binary search is employed which reduces the compile time required to determine maximum load latency for which registers can be assigned.

27 Claims, 3 Drawing Sheets

OTHER PUBLICATIONS

Huff, Richard A., "*Lifetime-Sensitive Modulo Scheduling*", Proceedings of the SIGPLAN '93 Conference on Programming Language Design and Implementation, pp. 258-267, Jun. 1993.

Lavery, Daniel M. et al., "*Unrolling-Based Optimizations for Modulo Scheduling*", IEEE, 1995.

Rau, B. Ramakrishna et al., "*Code Generation Schema for Modulo Scheduled Loops*", IEEE, 1992.

Rau, B. Ramakrishna et al, "*Iterative Modulo Scheduling: An Algorithm for Software Pipelining Loops*", Proceedings of the 27th Annual International Symposium on Microarchitecture, Nov. 1994.

Schlansker, Michael et al., "*Height Reduction of Control Recurrences for ILP Processors*", Proceedings of the 27th Annual International Symposium on Microarchitecture, pp. 40-51, Nov. 1994.

\* cited by examiner

DETERMINING MAXIMUM ACCEPTABLE SCHEDULING LOAD LATENCY USING HIERARCHICAL SEARCH

BACKGROUND

1. Field of the Invention

The present invention relates to instruction pipelining and more specifically to determining the maximum achievable load-use separation ("modeled load latency") of pipelined instructions.

2. Description of the Related Art

Generally, when certain types of instructions are scheduled for execution on a processor, it is desirable to obtain an instruction schedule that exhibits large load latencies, i.e., a schedule which tends to maximize distances (in modeled cycles) between load type instructions' use of data loaded thereby. However, when such load latencies are high, register utilization can increase dramatically. As a result, usage of instruction scheduling prevents a compiler from allocating registers for all live ranges of pipelined instructions.

As processor chips become faster, higher latencies of live ranges of pipelined instructions make it more difficult to maintain instruction level parallelism. A compiler typically determines the maximum load latency for which the available registers can be allocated. However, it is time consuming and harder for a compiler to find an acceptable maximum load latency with which all the live ranges of pipelined instruction can have efficient register allocation. A method and apparatus is needed to determine maximum acceptable load latency for which registers can be allocated.

SUMMARY

The present application, describes techniques for determining maximum acceptable modeled load latency (e.g., model number of clock cycles required between the time a load issues and the time its use can issue) for instruction scheduling which uses less compile time, in the order of $\log_2$ (Maximum load latency—Minimum load latency). Typically, during instruction scheduling, register pressure is monotonically non-decreasing with respect to the scheduled load latency. Therefore, in some embodiments, a binary search method is used to determine the acceptable schedule with the largest modeled load latency. According to an embodiment, the binary search reduces the compile time required to determine maximum load latency for which registers can be assigned.

In some embodiments, the present invention describes a method of preparing code for efficient execution on a target processor. The method includes evaluating candidate sequences of instructions based on, at least in part, register usage expected for execution of the respective candidate sequence on the target processor, wherein the candidate sequences each correspond to the code, but differ with respect to a load latency criterion, and selecting successive ones of the candidate sequences for the evaluating based on successive values for the load latency criterion. In some variations, the successive values of the load latency criterion are selected using a hierarchical search strategy. In some variations, the hierarchical search strategy includes a binary search strategy. In some embodiments, the method includes selecting a particular one of the evaluated candidate sequences based on correspondence of respective register usage level with a target level.

In some variations, the load latency criterion defines at least a nominal latency between a load-type operation and use of data loaded thereby. In some embodiments, the candidate sequence evaluating includes evaluating a particular candidate sequence scheduled using a first value of the load latency criterion, and if the particular candidate sequence exhibits a first register usage level that is at least substantially greater than a desired level thereof, evaluating a next candidate sequence scheduled using a second value of the load latency criterion, wherein the second value is less than the first value. In some variations, the candidate sequence evaluating includes evaluating a particular candidate sequence scheduled using a first value of the load latency criterion, and if the particular candidate sequence exhibits a first register usage level that is at least substantially less than an acceptable level thereof, evaluating a next candidate sequence scheduled using a second value of the load latency criterion, wherein the second value is greater than the first value.

In some embodiments, a code preparation facility is described. The code preparation facility is configured to evaluate candidate sequences of instructions based on at least in part, register usage expected for execution of the respective candidate sequence on the target processor, wherein the candidate sequences each correspond to the code, but differ with respect to a load latency criterion, and select successive ones of the candidate sequences for the evaluating based on successive nines for the load latency criterion. In some variations, the successive values of the load latency criterion are selected using a hierarchical search strategy. In some embodiments, the hierarchical search strategy includes a binary search strategy. In some variations, the code preparation facility is configured to select a particular one of the evaluated candidate sequences based on correspondence of respective register usage level with a target level. In some embodiments, the load latency criterion defines at least a nominal latency between a load-type operation and a use of data loaded thereby.

In some embodiments, the method includes generating each of the candidate sequences by scheduling at least a portion of the code with respective values for the load latency criterion. In some variations, the code includes source code, and the candidate sequences include separately schedulable subsequences of instructions, each subsequence scheduled in accordance with a respective load latency criterion. In some embodiments, at least some of the candidate sequences are prepared on-demand, in response to selection of a next successive value of the load latency criterion. In some variations, the method is embodied as at least a component of a code preparation facility encoded in media as instructions executable on a processor. In some variations, the processor and the target processor are different processors In some embodiments, a code preparation facility is decribed. The code preparation Facility is configured to evaluate candidate sequences of instructions based on, at least in part, register usage expected for execution of the respective candidate sequence on the target processor, wherein the candidate sequences each correspond to the code, but differ with respect to a load latency criterion, and select successive one of the candidate sequences for the successive values of the load latency criterion are selected using a hierarchial search strategy. In some embodiments, the hierarachial search strategy includes a binary search strategy. In some variations, the code preparation facility is configured to select a particular one of the evaluated level. In some embodiments, the load latency criterion defines at least a nominal latency between a load-type operation and a use of data loaded thereby.

In some variations, the code preparation facility is configured to evaluate a particular candidate sequence scheduled using a first value of the load latency criterion, and if the particular candidate sequence exhibits a first register usage level that is at least substantially greater than a desired level thereof, evaluate a next candidate sequence scheduled using a second value of the load latency criterion, wherein the second value is less than the first value. In some embodiments, the code preparation facility is configured to evaluate a particular candidate sequence scheduled using a first value of the load latency criterion, and if the particular candidate sequence exhibits a first register usage level that is at least substantially less than an acceptable level thereof, evaluate a next candidate sequence scheduled using a second value of the load latency criterion, wherein the second value is greater than the first value.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The present application, describes techniques for determining maximum acceptable modeled load latency (e.g., model number of clock cycles required between the time a load issues and the time its use can issue) for instruction scheduling which uses less compile time, on the order of $\log_2$ (Maximum load latency—Minimum load latency). Typically, during instruction scheduling, register pressure is monotonically non-decreasing with respect to the scheduled load latency. Therefore, in some embodiments, a hierarchical search method (e.g., binary search or the like) is used to determine the acceptable schedule with the largest modeled load latency. According to an embodiment, the binary search reduces the compile time required to determine maximum load latency for which registers can be assigned. According to an embodiment of the present invention, the method of determining maximum acceptable scheduling load latency can be practiced using a processor architecture described in a related U.S. patent application entitled "Modulo Scheduling via Binary Search for Minimum Acceptable Initiation Interval Method and Apparatus", Ser. No. 09/535,930 (now U.S. Pat. No. 6,671,878) filed on Mar. 24, 2000, which is incorporated herein. by reference in its entirety. An acceptable schedule is a schedule that requires less than or an equal number of available registers to generate code for a given code module (e.g., a loop or the like).

Figure 1:
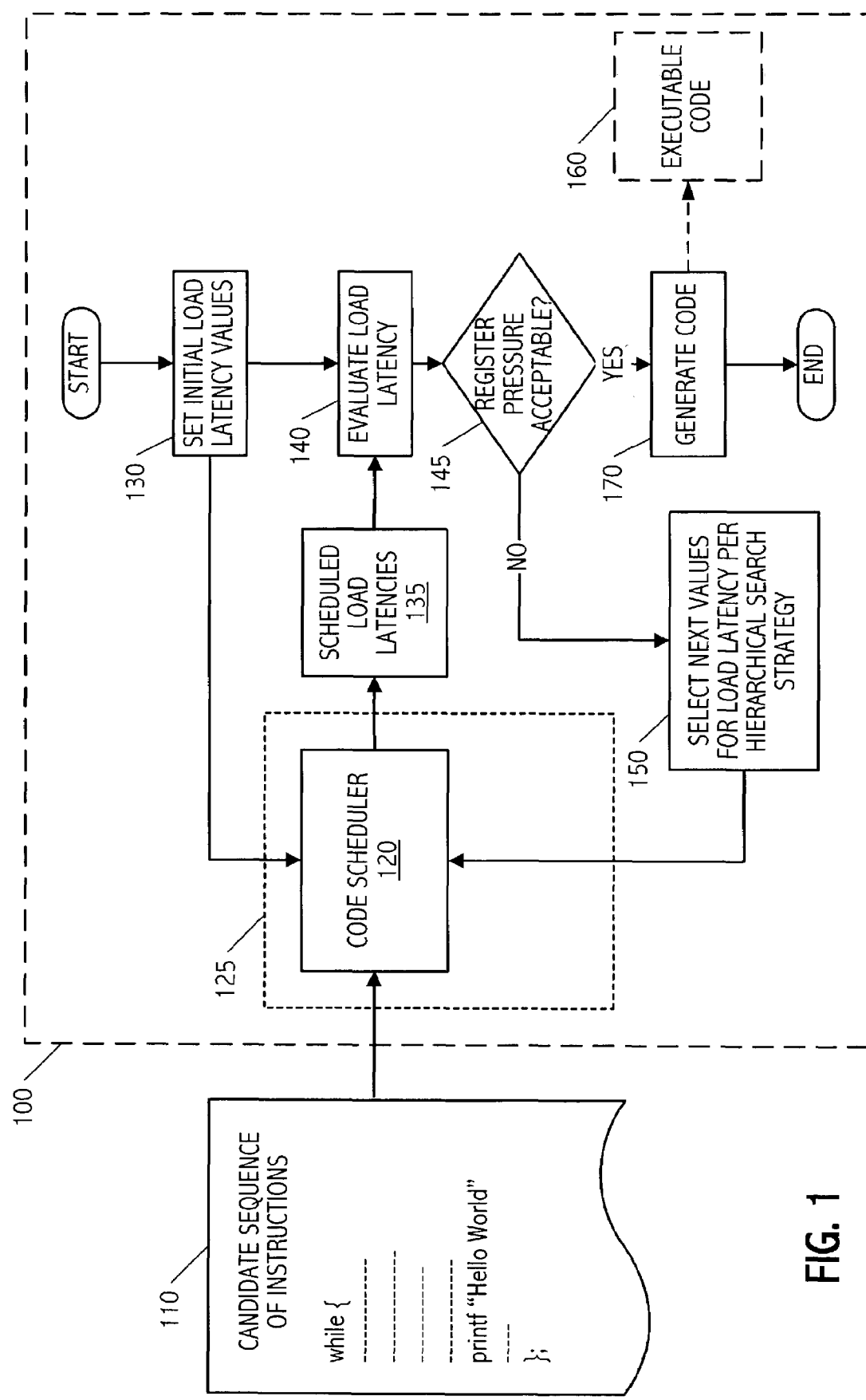
FIG. 1 illustrates an example of a process for determining maximum acceptable scheduling load latency using hierarchical search strategy on a target processor according to an embodiment of the present invention.

FIG. 1 illustrates an example a process for determining maximum acceptable scheduling load latency using hierarchical search strategy on a target processor 100 according to an embodiment of the present invention. A candidate sequence of instructions 110 is presented to a code scheduler 120 in target processor 100. Candidate sequence of instructions 110 can be any portion of code executing on target processor 100 (e.g., module, loop, block or the like). In the present example, a code scheduling facility 125 includes code scheduler 120. However, one skilled in the art will appreciate that code scheduler 120 can be independent code scheduler or embodied in any code preparation facility (e.g., compiler, post-optimizer or the like) and that code preparation facility can be located remotely. The process sets initial load latency values for candidate sequence of instructions 110 (130). The initial load latency values can include minimum and maximum acceptable values. The acceptable maximum load latency value is the one with which all the instructions in candidate sequence of instructions 110 can have efficient register allocation. The minimum load latency can be the latency for accessing the first level of memory (e.g., L0 cache, L1 cache or the like) in the processor. The maxirnmn load latency can be latency for accessing the next level of memory (e.g., L2 cache, main memory, external source or the like).

The initial load latency values are used by code scheduler 120 to schedule candidate sequence of instructions 110. Code scheduler 120 schedules the instructions and generates load latencies 135 for the scheduled instructions. The process evaluates the scheduled load latencies 135 (140). The process determines whether the register pressure for the scheduled load latencies 135 of candidate sequence of instructions 110 is acceptable (145). An acceptable register pressure is a schedule with load latencies that require less than or an equal number of registers that are available to generate executable code for candidate sequence of instructions 110. If the register pressure of the scheduled instructions is not acceptable, the process selects the next values for load latencies per hierarchical search strategy (e.g., binary search or the like) (150). The next selected load latency values are presented to code scheduler 120. Code scheduler uses the next set of load latency values to schedule candidate sequence of instructions 110. When the process determines that the register pressure of the scheduled instructions is acceptable for efficient register allocation, the process generates executable code 160 for the target processor using the scheduled instructions (170).

Figure 2:
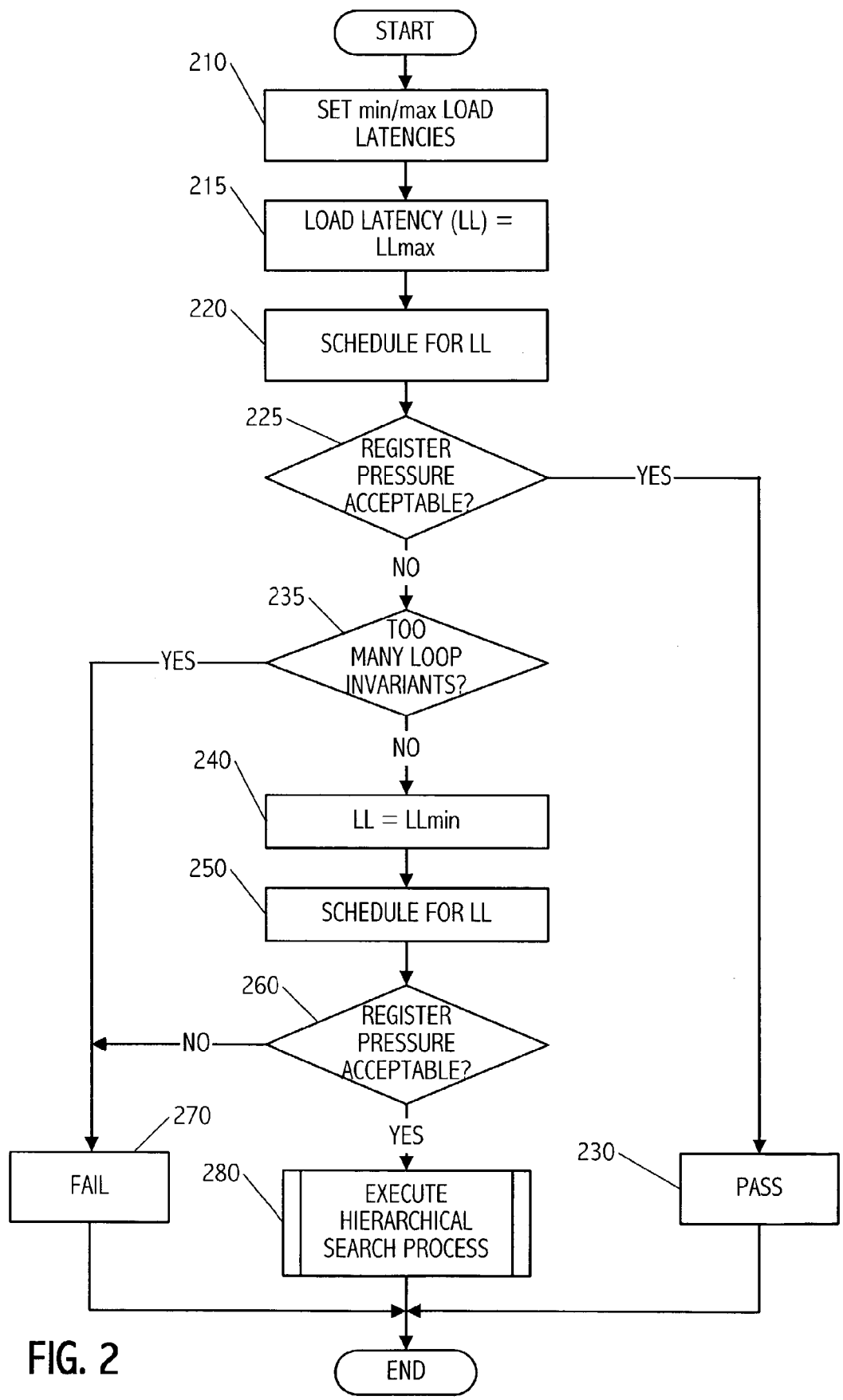
FIG. 2 is a flow diagram illustrating an exemplary sequence of operations performed during a process of determining maximum acceptable scheduling load latency in a target processor according to an embodiment of the present invention.

FIG. 2 is a flow diagram illustrating an exemplary sequence of operations performed during a process of determining maximum acceptable scheduling load latency in a target processor according to an embodiment of the present invention. While the operations are described in a particular order, the operations described herein can be performed in other sequential orders (or in parallel) as long as dependencies between operations allow. In general, a particular sequence of operations is a matter of design choice and a variety of sequences can be appreciated by persons of skill in art based on the description herein.

Initially, the process identifies and sets minimum and maximum load latencies for a given candidate sequences of instructions (210). The minimum load latency can be the latency for accessing the first level of memory (e.g., L0 cache, L1 cache or the like) in a memory hierarchy addressable by the target processor. The maximum load latency can be latency for accessing the next level of memory (e.g., L2 cache, main memory, external source or the like) in the memory hierarchy addressable by the target processor. For purposes of illustration, in the present example, the minimum load latency is defined using the indicator 'LLmin' the maximum load latency is defined using the indicator 'LLmax'. The process sets a modeled load latency indicator ('LL') to LLmax (215). The modeled load latency indicator is set to LLmax to determine if the instructions can be scheduled within the maximum load latency.

The process schedules the instructions using 'LL' which is set to the maximum latency LLmax (220). The process determines whether the candidate sequences of instructions were scheduled successfully with acceptable register pressure (225). A register pressure is acceptable if the number of registers required to generate executable code for the candidate sequences of instructions is less than or equal to the number of available registers. If the register pressure of the scheduled instructions is acceptable, the compiler has achieved the best latency for the instructions and the process is completed (230). If the register pressure of the scheduled instructions is not acceptable, the process determines whether there are too many loop invariants in the given candidate sequences of instructions (235).

The acceptable number of loop invariants in the instructions can be predetermined or dynamically determined based on the resource constraints at the time of execution of the given set of instructions. The method of determining resource constraints is known in the art. If there are more loop invariants than the determined limits, the process of finding maximum acceptable latency cannot proceed because the register pressure cannot be reduced to an acceptable level at any load latency. The process terminates without determining the maximum acceptable load latency (270). One skilled in art will appreciate that even though the process does not determine maximum acceptable load latency, a candidate sequence of instructions, with existing latencies, can be scheduled using conventional methods.

If the number of loop invariants is not more than the determined limits, the process sets the modeled load latency indicator (LL) to the minimum load latency (LLmin) (240). The modeled load latency indicator 'LL' is set to LLmin to determine a range of load latencies so that acceptable maximum load latency can be determined within that range. The process schedules the instructions using LLmin (250). The process determines whether the register pressure of the scheduled instructions is acceptable (250). If the register pressure of the scheduled instructions is not within the acceptable limits, the process cannot determine the maximum acceptable load latency and terminates (270). The instructions are then scheduled using conventional methods. If the register pressure of scheduled instructions is acceptable, the process proceeds to execute hierarchical search process (e.g., binary search or the like) to determine the maximum acceptable load latency within the determined range (280).

Figure 3:
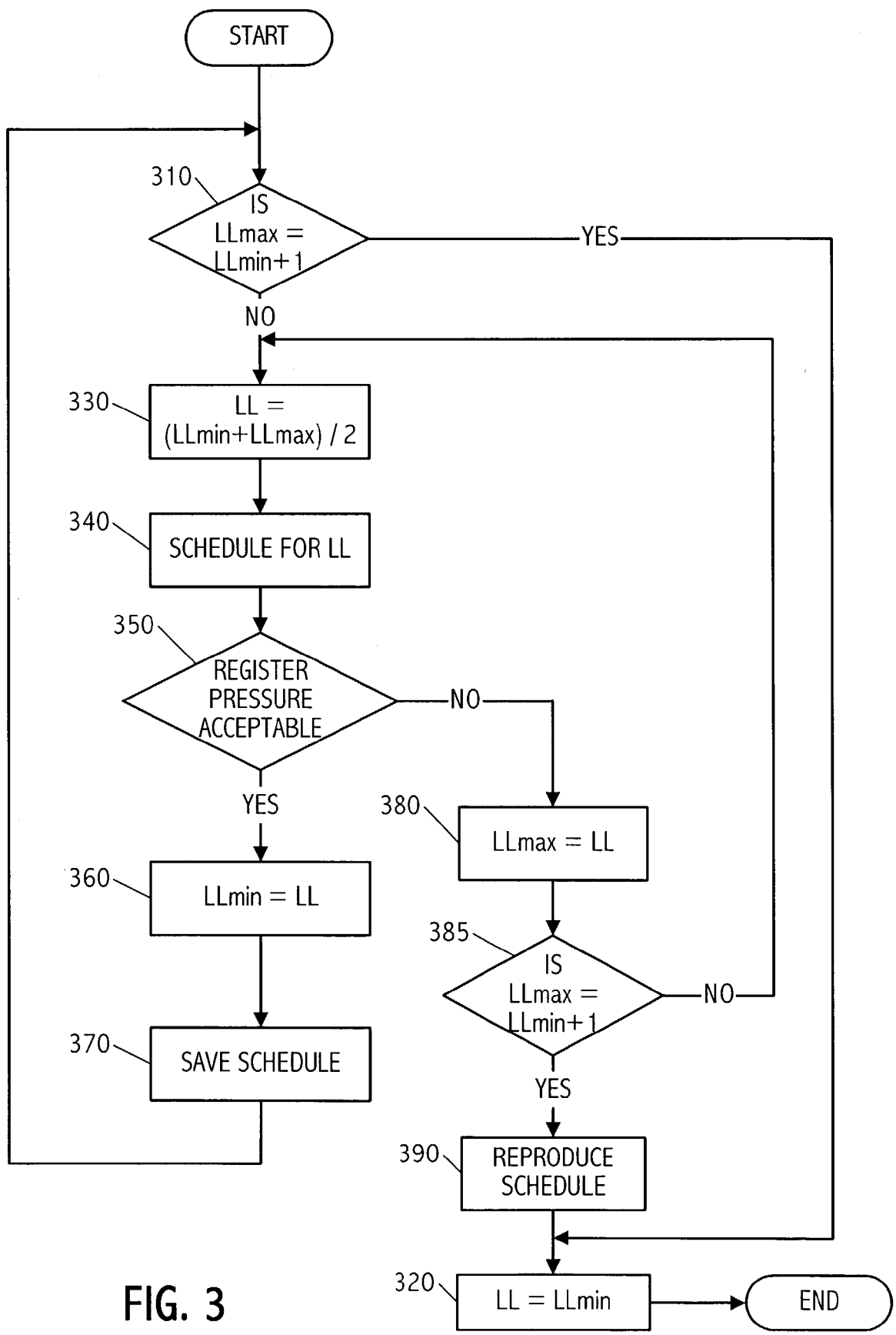
FIG. 3 is a flow diagram illustrating an exemplary sequence of operations performed for determining acceptable maximum load latencies using a binary search process in an exemplary implementation according to an embodiment of the present invention.

FIG. 3 is a flow diagram illustrating an exemplary sequence of operations performed for determining acceptable maximum load latencies using a binary search process in an exemplary implementation according to an embodiment of the present invention. While the operations are described in a particular order, the operations described herein can be performed in other sequential orders (or in parallel) as long as dependencies between operations allow. In general, a particular sequence of operations is a matter of design choice and a variety of sequences can be appreciated by persons of skill in art based on the description herein. Further, for purposes of illustration, an exemplary binary search scheme is used to determine acceptable maximum load latencies, one skilled in the art will appreciate that acceptable maximum load latencies can be determined using any hierarchical search scheme.

Initially, the process determines whether the maximum load latency (LLmax) is LLmin+1 (310). If LLmax is LLmin+1, the maximum acceptable load latency has been achieved and the process sets the modeled load latency indicator 'LL' to LLmin (320). If LLmax is not LLmin+1, the process proceeds to search for the best acceptable maximum load latency. The process begins a binary search by dividing the range in half and setting the modeled load latency indicator (LL) to [(LLmin+LLmax)/2) (330). This allows for a logarithmic search of an acceptable maximum latency within the range.

The process schedules the instructions using the new value for modeled load latency indicator 'LL' (340). The process determines whether the register pressure of scheduled instructions is acceptable (350). If the register pressure of the scheduled instructions is acceptable, the process sets LLmin to the current modeled load latency indicator (LL)(360). The process saves the instruction schedule produced in 340 as the one with possible acceptable maximum load latency (370). The process proceeds to the next iteration to find the next optimal acceptable maximum load latency by determining whether the maximum load latency (LLmax) is LLmin+1 (310). If LLmax is equal to LLmin+1, a best value for maximum acceptable load latency has been achieved and the process sets the modeled load latency indicator (LL) to LLmin, which is LLmax−1, and uses the saved schedule (320). If LLmax is not equal to LLmin+1 then the range is divided in half and the process is repeated to determine the maximum acceptable load latency for the new range.

If the register pressure of the scheduled instructions is not acceptable in 350, the process adjusts the maximum load latency (LLmax) to the current value of the modeled load latency indicator (LL) to set a new maximum limit for the next iteration (380). The process determines whether the maximum load latency (LLmax) is LLmin+1 (385). If LLmax is LLmin+1, the maximum acceptable load latency has been achieved and the process reproduces the instruction schedule, saved in 370 in the previous iteration (390) and sets the modeled load latency indicator (LL) to LLmin.

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description. For example, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include various hierarchical search schemes individually or in combination thereof to determine maximum acceptable load latency, multiple instances of a particular operation, and the order of operations may be altered in various other embodiments.

The operations discussed herein may consist of steps carried out by system users, hardware modules and/or software modules. In other embodiments, the operations of FIGS. 1-3, for example, are directly or indirectly representative of software modules resident on a computer readable medium and/or resident within a computer system and/or transmitted to the computer system as part of a computer program product.

The above described method, the operations thereof and modules therefor may be executed on a computer system configured to execute the operations of the method and/or may be executed from computer-readable media. Computer systems may be found in many forms including but not limited to mainframes, minicomputers, servers, workstations, personal computers, notepads, personal digital assistants, various wireless devices and embedded systems, just to name a few. A typical computer system includes at least one processing unit, associated memory and a number of input/output (I/O) devices. A computer system processes information according to a program and produces resultant output information via I/O devices. A program is a list of instructions such as a particular application program and/or an operating system. A computer program is typically stored internally on computer readable storage media or transmitted to the computer system via a computer readable transmission medium. A computer process typically includes an executing (running) program or portion of a program, current program values and state information, and the resources used by the operating system to manage the execution of the process. A parent computer process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The method described above may be embodied in a computer-readable medium for configuring a computer system to execute the method. The computer readable media may be permanently, removably or remotely coupled to system 100 or another system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein.

While particular embodiments of the present invention have been shown and described, it will be clear to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of preparing code for efficient execution on a target processor, said method comprising:
    evaluating candidate sequences of instructions based on, at least in part, register usage expected for execution of respective ones of the candidate sequences on the target processor, wherein the candidate sequences each correspond to the code, but differ with respect to a load latency criterion, and
    selecting successive ones of the candidate sequences for the evaluating based on successive values for the load latency criterion, wherein the successive values of the load latency criterion are selected using a hierarchical search strategy, the hierarchical search strategy including a binary search strategy.

2. The method of claim 1, further comprising:
    selecting a particular one of the evaluated candidate sequences based on correspondence of respective register usage level with a target level.

3. The method of claim 1, wherein the load latency criterion defines at least a nominal latency between a load-type operation and a use of data loaded thereby.

4. The method of claim 1, wherein the candidate sequence evaluating includes:
    evaluating a particular candidate sequence scheduled using a first value of the load latency criterion; and
    if the particular candidate sequence exhibits a first register usage level that is at least substantially greater than a desired level thereof, evaluating a next candidate sequence scheduled using a second value of the load latency criterion, wherein the second value is less than the first value.

5. The method of claim 1, wherein the candidate sequence evaluating includes:
    evaluating a particular candidate sequence scheduled using a first value of the load latency criterion; and
    if the particular candidate sequence exhibits a first register usage level that is at least substantially less than an acceptable level thereof, evaluating a next candidate sequence scheduled using a second value of the load latency criterion, wherein the second value is greater than the first value.

6. The method of claim 1, further comprising:
    generating each of the candidate sequences by scheduling at least a portion of the code with respective values for the load latency criterion.

7. The method of claim 1, wherein the code includes source code; and
    wherein the candidate sequences include separately schedulable subsequences of instructions, where each of the subsequences of instructions is scheduled in accordance with a respective load latency criterion.

8. The method of claim 1, wherein at least some of the candidate sequences are prepared on-demand, in response to selection of a next successive value of the load latency criterion.

9. The method of claim 1, embodied as at least a component of a code preparation facility encoded in media as instructions executable on a processor.

10. The method of claim 9, wherein the processor and the target processor are different processors.

11. A code preparation facility, comprising:
    at least one processor configured to:
        evaluate candidate sequences of instructions based on, at least in part, register usage expected for execution of respective ones of the candidate sequence on the target processor, wherein the candidate sequences each correspond to the code, but differ with respect to a load latency criterion, and select successive ones of the candidate sequences for the evaluating based on successive values for the load latency criterion, wherein the successive values of the load latency criterion are selected using a hierarchical search strategy, the hierarchical search strategy including a binary search strategy.

12. The code preparation facility of claim 11, further configured to select a particular one of the evaluated candidate sequences based on correspondence of respective register usage level with a target level.

13. The code preparation facility of claim 11, wherein the load latency criterion defines at least a nominal latency between a load-type operation and a use of data loaded thereby.

14. The code preparation facility of claim 11, wherein for the candidate sequence evaluating, the code preparation facility is further configured to:

evaluate a particular candidate sequence scheduled using a first value of the load latency criterion; and if the particular candidate sequence exhibits a first register usage level that is at least substantially greater than a desired level thereof, evaluate a next candidate sequence scheduled using a second value of the load latency criterion, wherein the second value is less than the first value.

15. The code preparation facility of claim 11, wherein for the candidate sequence evaluating, the code preparation facility is further configured to:

evaluate a particular candidate sequence scheduled using a first value of the load latency criterion; and if the particular candidate sequence exhibits a first register usage level that is at least substantially less than an acceptable level thereof, evaluate a next candidate sequence scheduled using a second value of the load latency criterion, wherein the second value is greater than the first value.

16. The code preparation facility of claim 11, further comprising: generate each of the candidate sequences by scheduling at least a portion of the code with respective values for the load latency criterion.

17. The code preparation facility of claim 11, wherein the code includes source code; and wherein the candidate sequences include separately schedulable subsequences of instructions, where each of the subsequences of instructions is scheduled in accordance with a respective load latency criterion.

18. The code preparation facility of claim 11, wherein at least some of the candidate sequences are prepared on-demand, in response to selection of a next successive value of the load latency criterion.

19. The code preparation facility of claim 11, encoded in media as instructions executable on a processor.

20. The code preparation facility of claim 19, wherein the processor and the target processor are different processors.

21. A code preparation facility comprising:

at least one processor that employs a hierarchical, load latency criterion based search strategy in evaluating successive candidate code schedules, wherein the hierarchical search strategy includes a binary search strategy.

22. The code preparation facility, as recited in claim 21, wherein a relation between register usage for scheduled code and a load latency criterion employed in scheduling thereof is essentially a monotonically non-decreasing relation.

23. The code preparation facility of claim 21, wherein the load latency criterion defines at least a nominal latency between a load-type operation and a use of data loaded thereby.

24. The code preparation facility of claim 21, wherein the candidate code includes source code; and wherein the candidate code include separately schedulable subsequences of instructions, where each of the subsequences of instructions is scheduled in accordance with a respective load latency criterion.

25. The code preparation facility of claim 21, wherein at least some of the candidate codes are prepared on-demand, in response to selection of a next successive value of the load latency criterion.

26. The code preparation facility of claim 21, encoded in media as instructions executable on a processor.

27. The code preparation facility of claim 26, wherein the processor and the target processor are different processors.

* * * * *